(12) United States Patent
Ostlie et al.

(10) Patent No.: US 10,718,890 B2
(45) Date of Patent: Jul. 21, 2020

(54) OPTICAL STRUCTURES WITH OFF-STATE APPEARANCE AREA

(71) Applicant: 3M INNOVATIVE PROPERTIES COMPANY, St. Paul, MN (US)

(72) Inventors: Brian W. Ostlie, Hudson, WI (US); Tao Liu, Woodbury, MN (US); Del R. Lawson, Cottage Grove, MN (US); Brent A. Hedding, Hudson, WI (US); James A. Phipps, River Falls, WI (US); Jeffrey J. Pederson, Colfax, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/080,755

(22) PCT Filed: Feb. 13, 2017

(86) PCT No.: PCT/US2017/017612
§ 371 (c)(1),
(2) Date: Aug. 29, 2018

(87) PCT Pub. No.: WO2017/151299
PCT Pub. Date: Sep. 8, 2017

(65) Prior Publication Data
US 2019/0072703 A1    Mar. 7, 2019

Related U.S. Application Data

(60) Provisional application No. 62/301,661, filed on Mar. 1, 2016.

(51) Int. Cl.
*G02B 6/02* (2006.01)
*F21V 8/00* (2006.01)
(Continued)

(52) U.S. Cl.
CPC ............ *G02B 6/001* (2013.01); *B60Q 1/2611* (2013.01); *B60Q 1/2661* (2013.01);
(Continued)

(58) Field of Classification Search
CPC ...................................................... G02B 6/001
(Continued)

(56) References Cited

U.S. PATENT DOCUMENTS 5,661,839 A * 8/1997 Whitehead ............. G02B 5/285
385/131
8,616,740 B2   12/2013 Anderson
(Continued)

FOREIGN PATENT DOCUMENTS

DE     10239579    1/2004
EP      1205352    5/2002
(Continued)

OTHER PUBLICATIONS

International Search Report for PCT International Application No. PCT/US2017/017612, dated May 17, 2017, 5 pages.

*Primary Examiner* — Christopher M Raabe
(74) *Attorney, Agent, or Firm* — Jonathan L. Tolstedt (57) ABSTRACT

A lightguide includes features for extracting light that would otherwise be confined and propagate within the lightguide primarily by total internal reflection. A first portion of light propagating within the lightguide and extracted exits the lightguide through a first area of the lightguide having an optical reflectance of at least 30% and an optical transmittance of at least 5% for normally incident light at a wavelength of the extracted light. A second portion of light propagating within the lightguide and extracted exits the lightguide through a different second area of the lightguide having an optical transmittance of at least 80% for normally incident light at the wavelength of the extracted light.

20 Claims, 8 Drawing Sheets

(51) Int. Cl.
 *B60Q 1/26* (2006.01)
 *B60Q 3/64* (2017.01)
 *B60Q 3/217* (2017.01)
(52) U.S. Cl.
 CPC ........... *B60Q 1/2669* (2013.01); *B60Q 3/217* (2017.02); *B60Q 3/64* (2017.02)
(58) Field of Classification Search
 USPC ........................................................ 362/511
 See application file for complete search history.

(56) References Cited

U.S. PATENT DOCUMENTS

| | | | |
|---|---|---|---|
| 2001/0016105 A1 | 8/2001 | Sugiyama | |
| 2009/0251917 A1 | 10/2009 | Wollner | |
| 2013/0123743 A1* | 5/2013 | Adams | A61M 5/16831 |
| | | | 604/500 |
| 2014/0355078 A1* | 12/2014 | Fujiuchi | H04N 1/02825 |
| | | | 358/474 |
| 2016/0299276 A1* | 10/2016 | Yamamoto | G02B 1/046 |
| 2017/0205042 A1* | 7/2017 | Kim | F21S 43/13 |
| 2017/0357040 A1* | 12/2017 | Liu | G02B 6/001 |
| 2019/0072708 A1* | 3/2019 | Liu | B60Q 1/2611 |

FOREIGN PATENT DOCUMENTS

| | | |
|---|---|---|
| WO | WO 2014-192797 | 12/2014 |
| WO | WO 2016-018719 | 2/2016 |
| WO | WO 2016-077110 | 5/2016 |
| WO | WO 2017-151412 | 9/2017 |

* cited by examiner

FIG. 7C

OPTICAL STRUCTURES WITH OFF-STATE APPEARANCE AREA

TECHNICAL FIELD

This disclosure relates generally to lightguides and to assemblies, systems, and methods related to such lightguides.

BACKGROUND

Light fibers have become increasing popular when utilized for linear lighting applications such as automotive, commercial buildings and similar implementations.

BRIEF SUMMARY

Some embodiments are directed to a lightguide comprising features for extracting light that would otherwise be confined and propagate within the lightguide primarily by total internal reflection. A first portion of light propagating within the lightguide and extracted exits the lightguide through a first area of the lightguide having an optical reflectance of at least 30% and an optical transmittance of at least 5% for normally incident light at a wavelength of the extracted light. A second portion of light propagating within the light guide and extracted exits the lightguide through a different second area of the lightguide having an optical transmittance of at least 80% for normally incident light at the wavelength of the extracted light.

According to some implementations, a light source is disposed at one or both of a first end and a second end of the lightguide. Light emitted by each light source at the wavelength of the extracted light enters the lightguide from the first end and propagates within the lightguide primarily by total internal reflection.

According to some embodiments, an elongate lightguide extends along a length of the lightguide. The lightguide includes different first and second regions for extracting light. Each region comprises a plurality of spaced apart light extractors arranged along the length of the lightguide for extracting light at a desired wavelength that would otherwise be confined and propagate within the lightguide along the length of the lightguide. Light extracted by the first region exits the lightguide through a first area having an optical reflectance of at least 30% and an optical transmittance of at least 5% for normally incident light at the desired wavelength. Light extracted by the second region exits the light guide through a second area, different from the first area, having an optical transmittance of at least 80% for normally incident light at the desired wavelength.

Some embodiments involve an optical system that includes an elongate optical cavity and an elongate lightguide. The elongate optical cavity extends along a length of the optical cavity. The elongate optical cavity includes a first area having an optical reflectance of at least 30% and an optical transmittance of at least 5% for normally incident light at a desired wavelength. The elongate optical cavity includes a different second area having an optical transmittance of at least 80% for normally incident light at the desired wavelength. The elongate lightguide is disposed in and coextensive with the optical cavity. The lightguide comprises a plurality of spaced apart light extractors arranged along a length of the lightguide for extracting light at a desired wavelength that would otherwise be confined and propagate within the lightguide along the length of the lightguide. At least first and second portions of light extracted by the light extractors exit the optical system through the respective first and second areas of the optical cavity.

According to some embodiments, an optical non-planar lightguide includes light extractors for extracting light at a desired wavelength that would otherwise be confined and propagate within the lightguide primarily by total internal reflection. The non-planar lightguide comprises a core layer having a higher core index. A cladding layer is disposed on at least a portion of the core layer and has a lower cladding index. A reflective layer is disposed on at least a portion of the cladding layer and has an optical reflectance of at least 30% and an optical transmittance of at least 5% for normally incident light at the desired wavelength, such that at least 2% of light extracted by the light extractors exits the lightguide through the reflective layer.

Some embodiments are directed to an illumination system for a vehicle. The illumination system includes a structure configured to mount to the vehicle. The structure includes a lightguide having different first and second regions for extracting light. Each region comprises a plurality of spaced apart light extractors arranged along the length of the lightguide for extracting light at a desired wavelength that would otherwise be confined and propagate within the lightguide along the length of the lightguide. Light extracted by the first region exits the lightguide through a first area having an optical reflectance of at least 30% and an optical transmittance of at least 5% for normally incident light at the desired wavelength. Light extracted by the second region exits the light guide through a second area, different from the first area, having an optical transmittance of at least 80% for normally incident light at the desired wavelength.

These and other aspects of the present application will be apparent from the detailed description below. In no event, however, should the above summaries be construed as limitations on the claimed subject matter, which subject matter is defined solely by the attached claims.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Light fibers that have a non-plastic and/or metallized appearance when in the off-state are aesthetically pleasing when used in linear lighting applications. For example, in automotive applications, a metallic or chrome-like appearance may be particularly favored by consumers. However, light absorption from a coating on the lightguide can be significant, reducing the light output over the length of the light fiber. Embodiments disclosed herein relate to lightguides and lightguide assemblies having reduced light absorption in the on-state and/or an aesthetically pleasing appearance in the off-state.

According to some embodiments, the lightguides and assemblies disclosed herein are configured to provide light through separate first and second areas to facilitate and enhanced off-state appearance while also providing suitable functional illumination. The first area provides an aesthetically pleasing off state appearance and may have a relatively lower optical transmittance that the second area. Light exiting the lightguide may have an intensity sufficient to provide accent lighting and/or functional illumination lighting, for example.

Figure 1A:
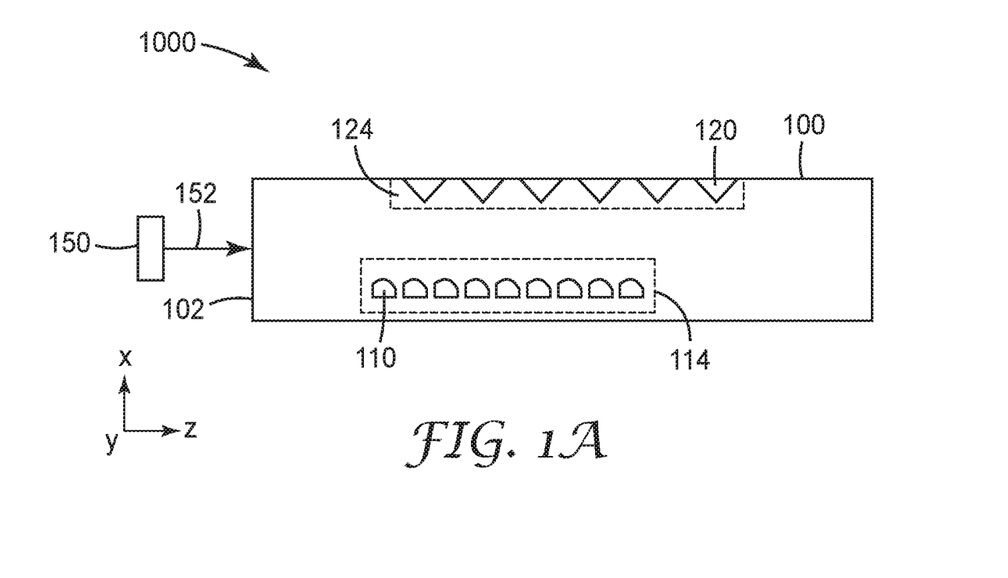
FIG. 1A shows a lightguide assembly that includes a lightguide in accordance with some embodiments.
Figure 2A:
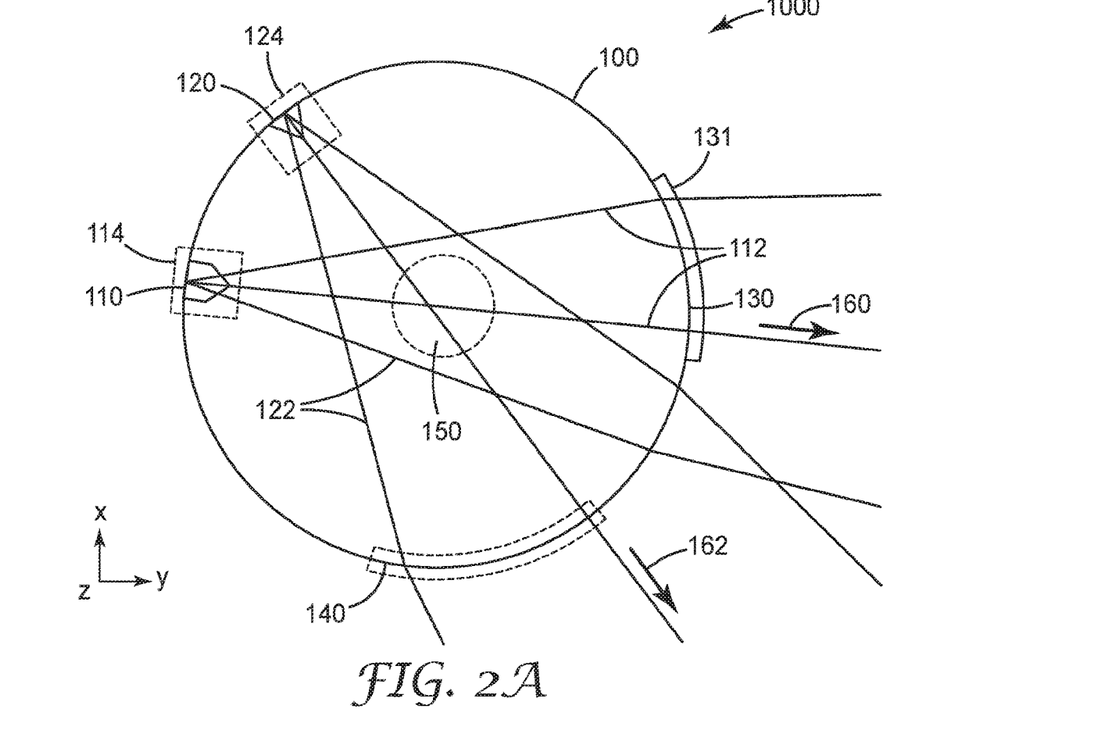
FIG. 2A is a cross sectional view of the lightguide assembly of FIG. 1A.

FIGS. 1A and 2A respectively show side and cross sectional views of a lightguide assembly 1000 that includes a lightguide 100 in accordance with some embodiments. As best seen in FIG. 1A, in some embodiments, the lightguide 100 is elongated along the length direction Z of the lightguide 100. The lightguide 100 includes features 110, 120 configured to extract light that would otherwise be confined and propagate within the lightguide 100 primarily by total internal reflection. A first portion 112 of light propagates within the lightguide 100 and is extracted and exits the lightguide 100 through a first area 130 of the lightguide 100. A second portion 122 of the light propagating within the lightguide 100 is extracted and exits from the lightguide 100 through a different second area 140 of the lightguide 100.

In some embodiments the first area 130, but not the second area 140, comprises a coating 131 that is partially reflective at the wavelength of the extracted light. The first area 130 may have an optical reflectance of at least 30% or at least 50% and an optical transmittance of at least 5% or at least 10% or at least 30% for normally incident light at a wavelength of the extracted light. The second area 140 may have an optical transmittance of at least 80% or at least 90% for normally incident light at the wavelength of the extracted light. The wavelength of the extracted light may comprise a wavelength in a range from about 420 nm to about 680 nm, for example. For example, according to some aspects, the transmission of light through the first area is a desirable transmission as opposed to an undesirable transmission of light. As such, the optical transmittance of the first area is more than a leakage amount.

Figure 3A:
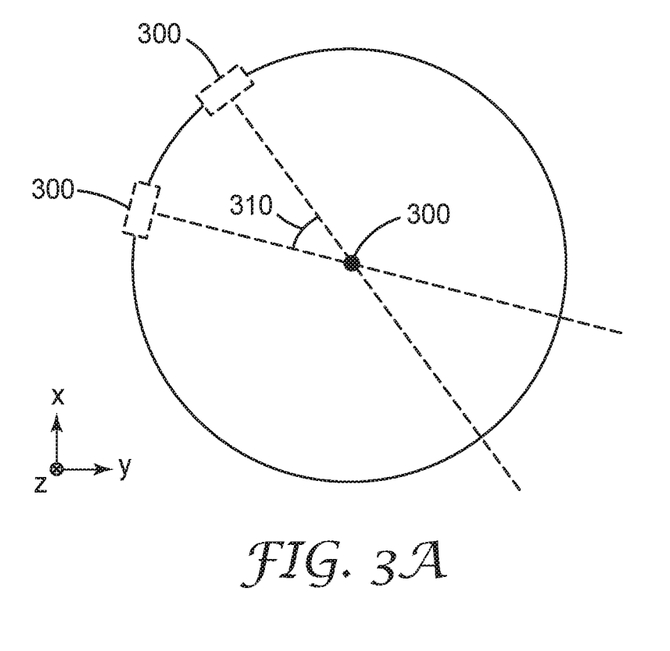
FIG. 3A shows in more detail the relative locations of the first and second regions of the lightguide according to some embodiments.
Figure 3B:
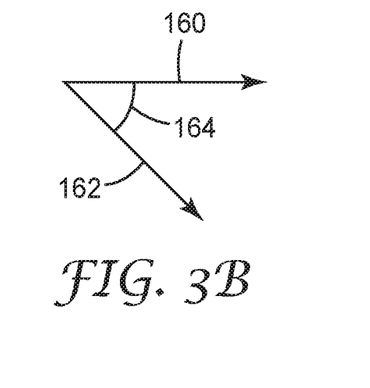
FIG. 3B illustrates the relationship between the direction of the first portion of light that exits the lightguide and the direction of the second portion of light exits the lightguide.

With reference to FIGS. 1A and 3B, the first portion 112 of light exits the lightguide 100 along a first direction 160 and the second portion 122 of light exits the lightguide along a different second direction 162. An angle 164 between the first direction 160 and the second direction 162 may be in a range from about 30 degrees to about 150 degrees or in a range from about 50 degrees to about 120 degrees.

In some embodiments, the coating 131 of the first area 130 is a metal or metallized coating and/or provides a metal or chrome look when light source 150 is not emitting light and the lightguide system 1000 is in the off-state. In some embodiments, the coating 131 may be a color coating so that the light that emerges from the lightguide through area 130 is a different color than the light that emerges through area 140.

Figure 7A:
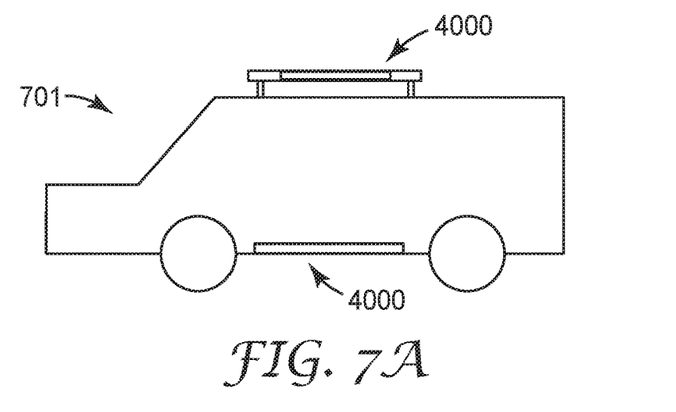
FIGS. 7A through 7C illustrate illumination systems for automotive applications in accordance with some embodiments.
Figure 7B:
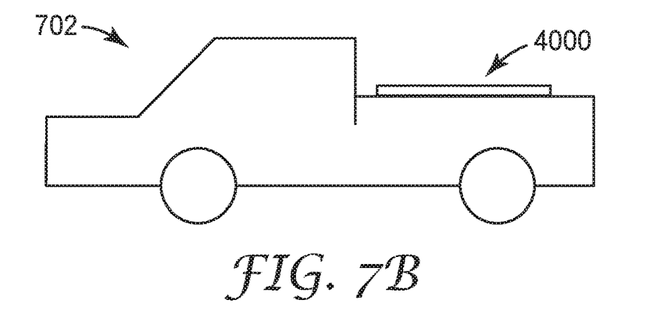

As explained in more detail in conjunction with FIGS. 7A and 7B, in some applications, when the light source 150 is emitting light, the light exiting the lightguide 100 through the first area 130 may provide relatively lower intensity light for accent lighting. Light exiting the lightguide 100 through the second area 140 may provide for functional illumination lighting with relatively higher intensity.

The lightguide 100 has a first region 114 that is different than the first area 130 and a second 124 region that is different from the second area 140. First features 110 configured to extract the first portion 112 of light are disposed in the first region 114. Second features 120 configured to extract the second portion of light 114 are disposed in the second region 124. The first region 114 is oriented so that it faces the first area 130 and the second region 124 is oriented to face the second area 140. In some embodiments at least 10% of light extracted by the first region 114 exits the lightguide 100 through the first area 130, and at least 70%, at least 80%, or at least 90% of light extracted by the second region 124 exits the lightguide 100 through the second area 140. According to some embodiments, at least 20% of the light extracted by the first region 114 exits the lightguide 100 through the first area 130, and at least 70% of the light extracted by the second region 124 exits the lightguide 100 through the second area 140.

Figure 1B:
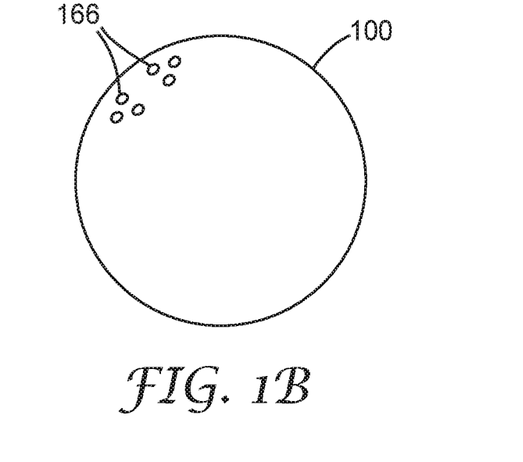
FIG. 1B illustrates extraction features comprising plurality of particles dispersed within the lightguide according to some embodiments.

The first and/or second features 110, 120 may comprise light extractors that extract light primarily by scattering, reflecting and/or refracting light. In some embodiments, the first features 110 comprise a plurality of first light extractors spaced apart along the length direction Z of the lightguide 100. The second features 120 comprise a plurality of second light extractors spaced apart along the length direction Z of the lightguide 100. As illustrated in FIG. 1A, in some embodiments, the first and/or second features 110, 120 may comprise a plurality of spaced apart notches formed in an exterior surface of the lightguide 100. In some embodiments, the first and/or second features 110, 120 may comprise spaced apart protrusions formed in an exterior surface of the lightguide 100. As illustrated by FIG. 1B, in some implementations, one of more of the first and second features 110, 120 may comprise a plurality of particles 166 dispersed within the lightguide 110.

In some embodiments, the lightguide 100 has gradient index along a thickness direction of the lightguide 100. The lightguide 100 may comprise a higher index core partially or substantially completely surrounded by a lower index cladding as discussed in more detail herein.

As illustrated in FIG. 1A, the lightguide assembly 1000 includes the lightguide 100, as discussed above, and at least one light source 150 disposed at a first end 102 of the lightguide 100. The light source 150 is configured to emit light 152 at the desired wavelength. The light 152 enters the lightguide 100 from the first end 102 and propagates within the lightguide 100 primarily by total internal reflection.

Figure 2B:
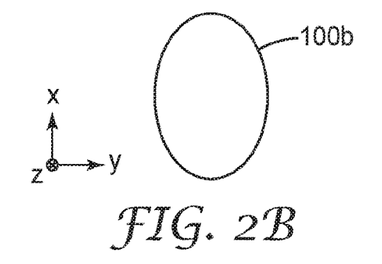
FIGS. 2B through 2H show various lightguide cross sectional profiles in accordance with some embodiments.
Figure 2C:
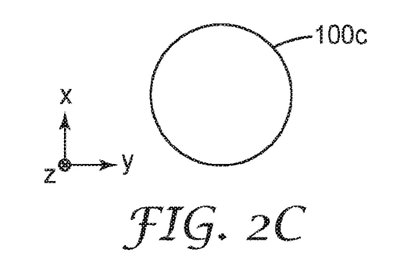
Figure 2D:
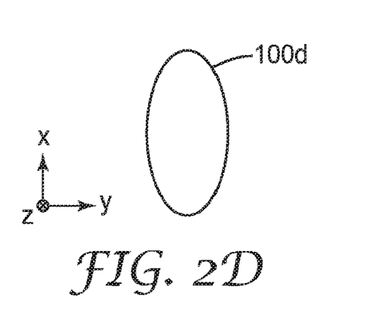
Figure 2E:
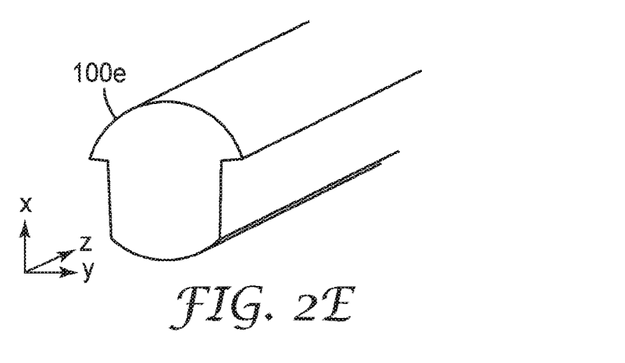
Figure 2F:
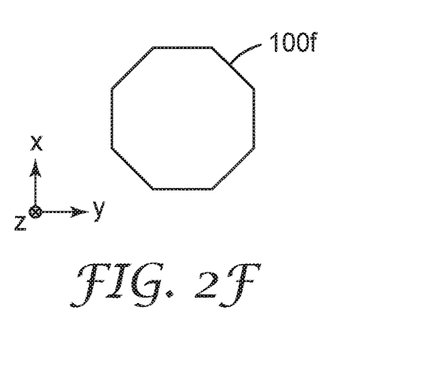
Figure 2G:
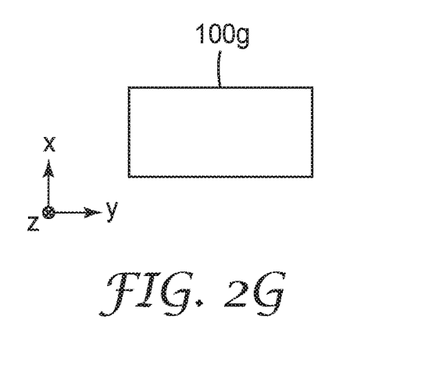
Figure 2H:
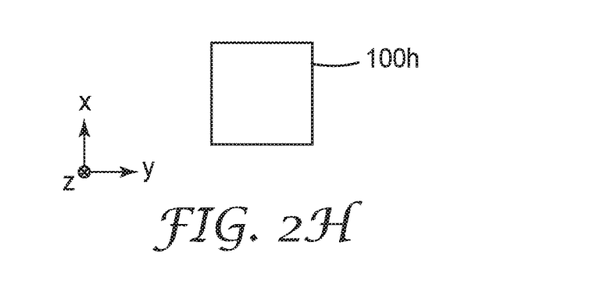

In various embodiments, the lightguide may be a non-planar lightguide and/or may have a variety of cross sectional profiles along the length direction Z as illustrated by FIGS. 2B through 2H. FIG. 2B shows a lightguide 100*b* having a round cross sectional profile; FIG. 2C shows a lightguide 100*c* having a circular cross sectional profile; FIG. 2D illustrates a lightguide 100*d* having an elliptical cross sectional profile; and FIG. 2E shows a lightguide 100*e* having a mushroom shape cross sectional profile. In some embodiments, the cross sectional profile of the lightguide 100*f* may be a polygon as illustrated in FIG. 2F. FIG. 2G shows a lightguide 100*g* that has a square cross sectional profile and FIG. 2H shows a lightguide 100*h* that has a rectangular cross sectional profile.

Figure 2I:
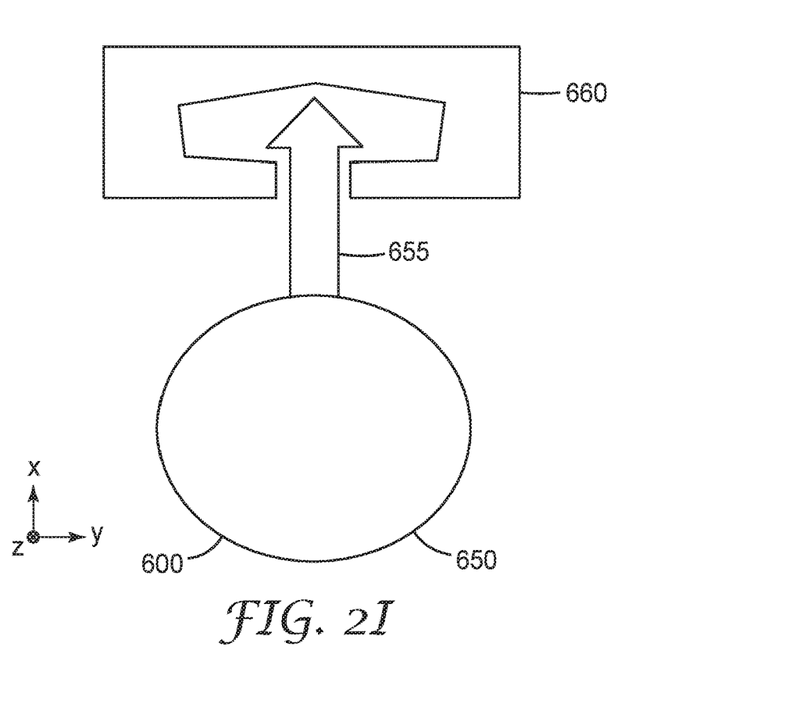
FIG. 2I through FIG. 2K show various views of a lightguide attachment configuration in accordance with some embodiments.
Figure 2J:
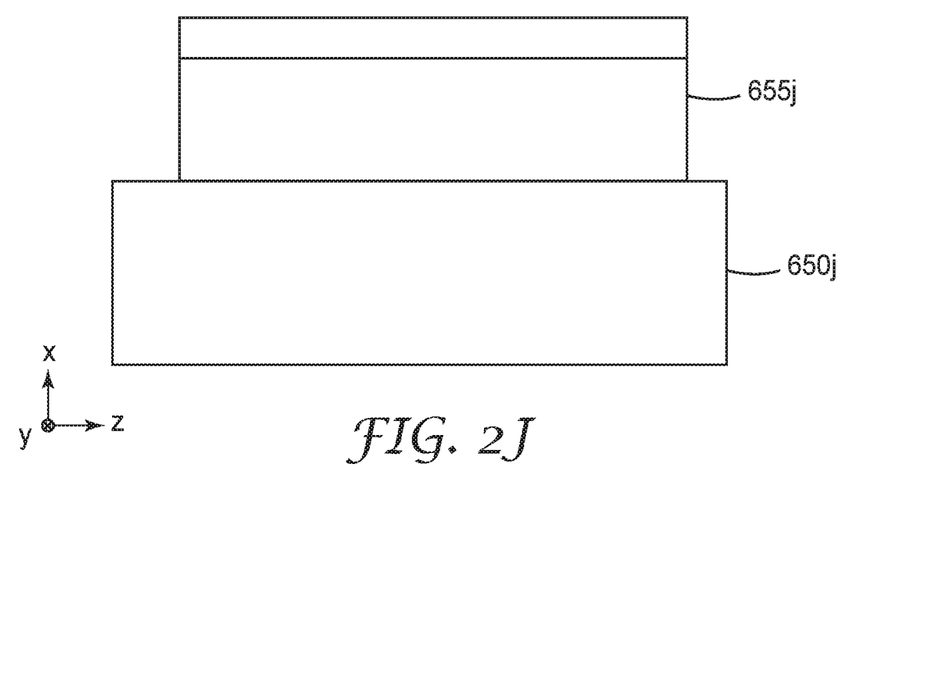
Figure 2K:
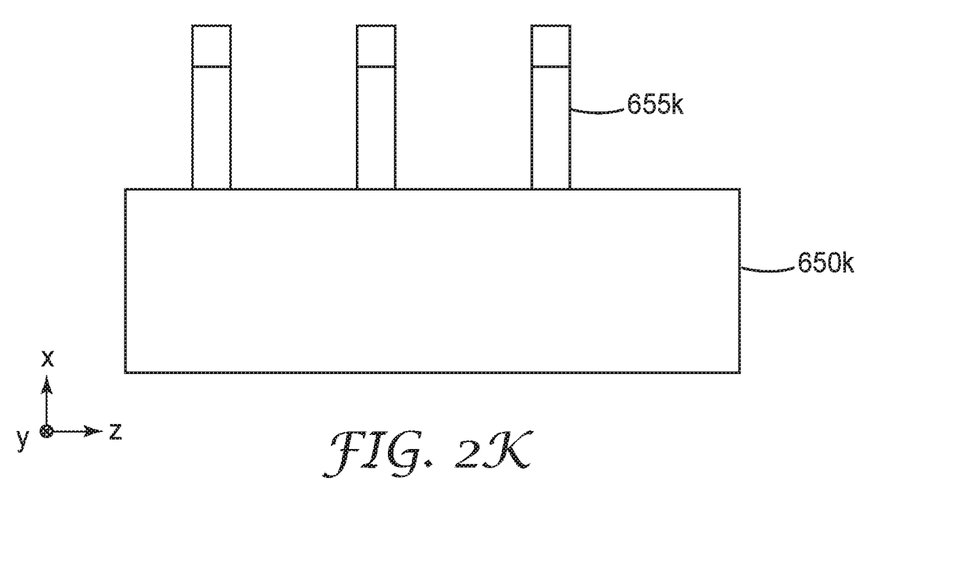

FIG. 2I through FIG. 2K show various views of lightguide attachment configurations in accordance with some embodiments. In the configurations shown in FIGS. 2I through 2K, a first lightguide portion 650 primarily guides light and a second lightguide portion 655 is primarily used for attaching the lightguide 100 to a lightguide support 660. In transverse cross-section of the lightguide 600, the first lightguide portion 650 may be round as shown in FIG. 2I, and the second lightguide portion 655 may have a generally arrow shape. In general, the lightguide portion 650 may have any suitable cross sectional profile including the profiles illustrated in FIGS. 2B through 2H, for example.

As shown in FIG. 2J, in some embodiments, the first 650*j* and second 655*j* lightguide portions are continuous along a length of the lightguide 600. As shown in FIG. 2K, in some embodiments, the first lightguide portion 650*k*, but not the second lightguide portion 655*k*, is continuous along a length of the lightguide 600.

FIG. 3A shows in more detail the relative locations of the first 114 and second 124 regions of lightguide 100. As illustrated in FIG. 3A, the elongate lightguide 100 is generally centered on an optical axis 300. The first and second regions 114, 124 are centered at different respective first and second azimuthal angles relative to the optical axis 300. For example, in some embodiments, a difference between the first and second azimuthal angles is at least 20 degrees.

Figure 4:
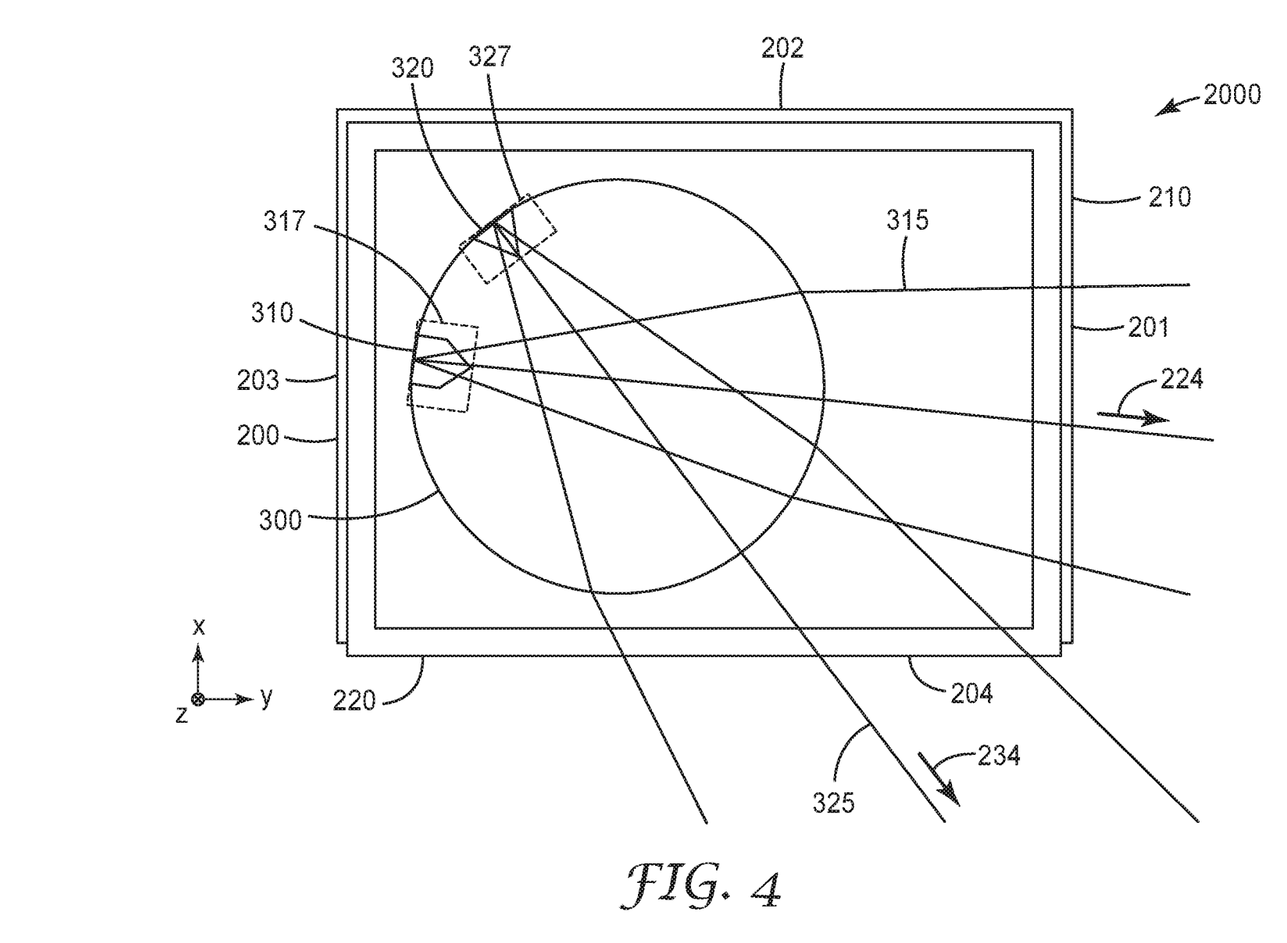
FIG. 4 illustrates an optical system in accordance with some embodiments.

FIG. 4 illustrates an optical system 2000 in accordance with some embodiments. The optical system 2000 includes an elongate optical cavity 200 extending along a length of the optical cavity 200. The optical cavity 200 includes a first area 210 having an optical reflectance of at least 30% or at least 50%, and an optical transmittance of at least 5% or at least 10% or at least 30% for normally incident light at a desired wavelength. The optical cavity 200 includes a different second area 220 having an optical transmittance of at least 80% or at least 90% for normally incident light at the desired wavelength. The desired wavelength may comprise a wavelength in a range from about 420 nm to about 680 nm, for example.

An elongate lightguide 300 is disposed in and is coextensive with the optical cavity 200. In some embodiments, the optical cavity 200 and the lightguide 300 define an air gap therebetween. The optical cavity 200 may provide a protective covering for the lightguide 300. In some embodiments, the optical cavity 200 provides a hermetically sealed covering.

The lightguide 300 includes a plurality of spaced apart light extractors 310, 320. The light extractors 310, 320 are arranged along a length of the lightguide 300 and are configured to extract light from the lightguide 300 at the desired wavelength that would otherwise be confined and propagate within the lightguide 300 along the length of the lightguide 300. At least first 315 and second 325 portions of light extracted by the light extractors 310, 320 exit the optical system 2000 through the respective first and second areas 210, 220 of the optical cavity 200. According to some embodiments, the first portion 315 is at least 10% of the light extracted by the light extractors 310, 320 and the second portion 325 is at least 70% of the light extracted by the light extractors 310, 320. According to some embodiments, the first portion 315 is at least 10% of the light extracted by the light extractors 310, 320 and the second portion 325 is at least 80% of the light extracted by the light extractors 310, 320.

As shown in FIG. 4, in some embodiments, the optical cavity 200 may have a polygonal cross sectional profile and the lightguide 300 may have a round cross sectional profile. In the illustrated embodiment, the optical cavity 200 has a plurality of sides 201-204. A first side 201 in the plurality of sides comprises the first area 210 and a different second side 204 in the plurality of sides comprises the second area 220.

The plurality of spaced apart light extractors 310, 320 may include a plurality of first light extractors 310 disposed in a first region 317 that are configured to extract light that exits the optical system 2000 through the first area 210. The plurality of spaced apart light extractors 310, 320 may include a plurality of second light extractors 320 disposed in a different second region 327 configured to extract the light the exits the optical system 2000 through the second area 220.

Figure 5:
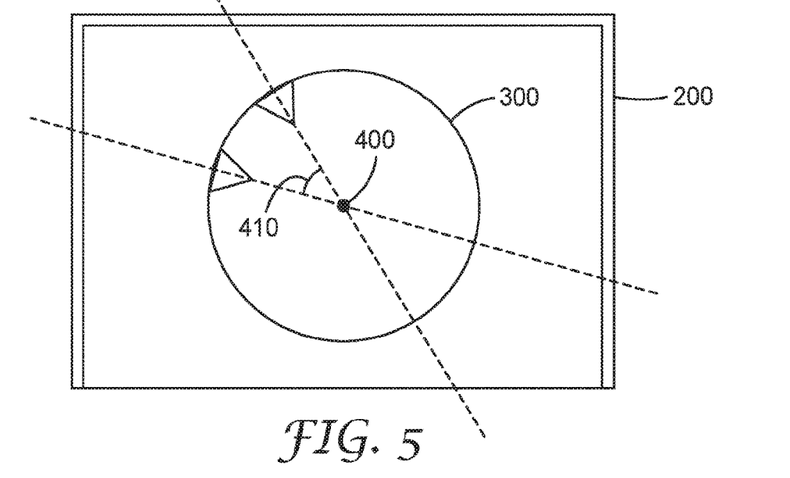
FIG. 5 shows the relative positions of the first and second regions of the lightguide of FIG. 4.

As shown in FIG. 5, the lightguide 300 is disposed within the optical cavity 200 and is centered on an optical axis 400. The first and second regions 317, 327 may be centered at different respective first and second azimuthal angles relative to the optical axis 400. According to some embodiments, the difference 410 between the first and second azimuthal angles is at least 20 degrees.

The lightguide as discussed above may include a core and cladding that, when used with a reflective, metallic or other type layer in a first area of the lightguide, enhances the off-state appearance of the lightguide and provides for longer length lightguide applications. The first area provides a pleasing off-state appearance for the lightguide. The cladding is configured to decouple the core from the reflective layer to reduce light absorption losses for long length applications.

Figure 6A:
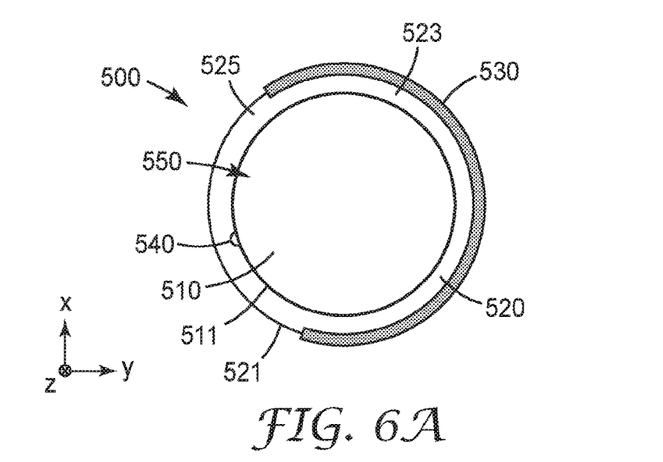
FIGS. 6A and 6B provide transverse and side cross sectional views of an optical non-planar lightguide in accordance with some embodiments.
Figure 6B:
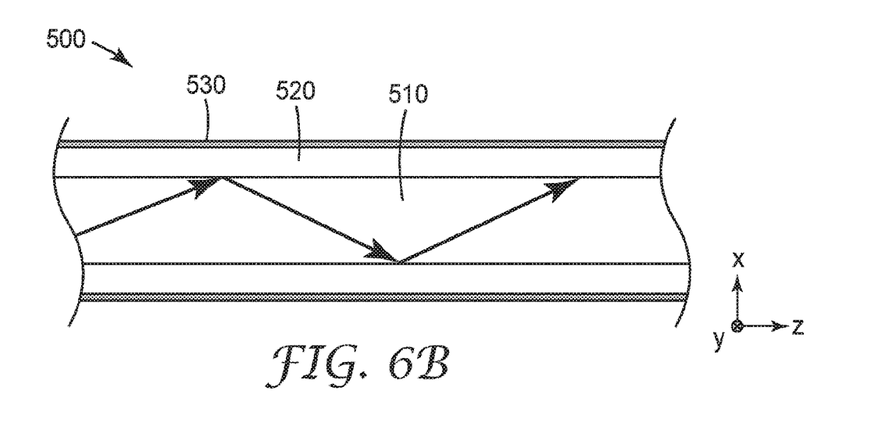

FIGS. 6A and 6B show transverse and side cross sectional views of an optical non-planar lightguide 500 suitable for use, for example, in the optical assembly of FIG. 1A. The lightguide 500 may comprise light extractors 540, 550 configured to extract light at a desired wavelength that would otherwise be confined and propagate within the lightguide 500 primarily by total internal reflection. The lightguide 500 includes a core layer 510 having a higher core index surrounded by a cladding layer 520 having a lower cladding index. For example, the core 510 may have an index in a range from about 1.4 to about 1.7 and the cladding 520 may have an index in a range from about 1.2 to about 1.5. In some implementations, the core 510 has a thickness in a range from about 0.5 mm to about 20 mm and the cladding 520 has a thickness in a range from about 10 microns to about 1000 microns. According to some embodiments, the cladding 520 comprises air. The lightguide 500 may have a gradient index along a thickness direction of the lightguide 500. The core 510 may have a gradient index along a thickness direction of the core 510. The cladding 520 may have a gradient index along a thickness direction of the cladding 520.

A reflective layer 530 is disposed on at least a portion of the cladding layer 520 and/or on at least a portion of the core layer. The reflective layer 530 may have an optical reflectance of at least 30% or at least 50% and an optical transmittance of at least 5% or at least 10% or at least 30% for normally incident light at the desired wavelength. In some implementations at least 50% of light extracted by the light extractors exits the lightguide 500 through the reflective layer 530. In some embodiments, the reflective layer 530 comprises a metal layer. In some implementations, the reflective layer 530 comprises at least one dielectric layer.

The cladding layer 520 may be sufficiently thick so that light propagating within the lightguide 500 primarily by total internal reflection undergoes a loss in optical intensity due to the reflective layer 530 that is less than about 5% or less than about 2%. In some embodiments, the cladding layer 520 covers substantially an entire external surface 511 of the core layer 510. In some embodiments, the reflective layer 530 covers substantially an entire external surface 521 of the cladding layer 520. The reflective layer 530 may be disposed on a first portion 523, but not second portion 525 of the cladding layer 520. The light extractors may comprise different first 540 and second 550 pluralities of light extractors. According to some configurations, at least 80% of light extracted by the first plurality of light extractors 540 exits the lightguide 500 through the first portion 523 of the cladding layer 520 and at least 80% of light extracted by the second plurality of light extractors 550 exits the lightguide 500 through the second portion 525 of the cladding layer 520.

In some embodiments, at least some of the light extractors are protrusions 540 formed on the external surface 511 of the core layer 510. In some embodiments, at least some of the light extractors are recesses 550 formed in an external surface 511 of the core layer 510.

The lightguide 500 is shown in FIG. 6A as having a circular cross sectional profile. In general, the lightguide 500 may have any cross sectional profile, such as the cross sectional profiles illustrated in FIGS. 2A through 2E.

Figure 7C:
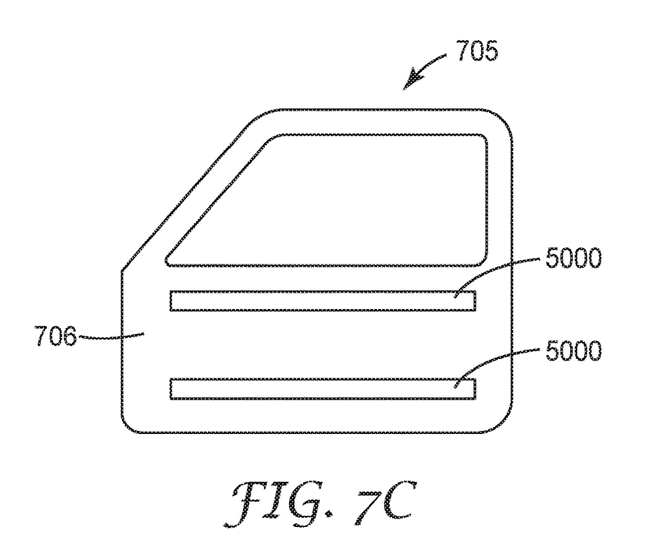

FIGS. 7A through 7C illustrate illumination systems for automotive applications in accordance with some embodiments. The illumination systems having components as described herein may be used in interior and/or exterior locations on the vehicle. FIG. 7A shows a vehicle 701 having an illumination system 4000 providing one or both of an illuminated roof rack and an illuminated running board or step assist. FIG. 7B shows a truck 702 that includes an illumination system 4000 that provides an illuminated truck bed rail. FIG. 7C illustrates an application in which an illumination system 5000 having components as discussed herein is disposed in an interior 705 of a vehicle, represented in FIG. 7E as the interior of the vehicle door panel 706.

The vehicle illumination system 4000, 5000 may comprise the lightguide system 1000 discussed in connection with FIG. 1 or the optical subassembly as discussed in connection with FIG. 4, for example. With reference to FIGS. 1 through 2, the lightguide 100 includes different first 114 and second 124 regions for extracting light. Each region 114, 124 comprises a plurality of spaced apart light extractors 110, 120 arranged along the length of the lightguide 100 for extracting light at a desired wavelength that would otherwise be confined and propagate within the lightguide 100. Light extracted by the first region 114 exits the light guide 100 along direction 160 through a first area 130 having an optical reflectance of at least 30% or at least 50% and an optical transmittance of at least at 5% or at least 10% or at least 30% for normally incident light at the desired wavelength. Light extracted by the second region 124 exits the lightguide 100 along direction 162 through a second area 140, different from the first area 130. The second area 140 has an optical transmittance of at least 80% or at least 90% for normally incident light at the desired wavelength. As illustrated in FIG. 2A, the first area 130 may include a partially reflective coating 131.

The first area 130 may be positioned so that it is easily observable by a driver during normal usage of the vehicle 701, 702. The coating 131 of the first area 130 may provide a pleasing metallized or chrome-look finish from the perspective of the driver. The second area 140 may be positioned so that it is not seen by the driver in normal usage of the vehicle 701, 702. For example, the first area 130 may be observable by the driver as the driver walks toward and/or enters the vehicle and the second area 140 may not be observable by the driver during these activities.

Light exits the first area 130 generally along direction 160 and light exits the second area 140 generally along direction 162. In some embodiments, the light that exits the lightguide 100 generally along direction 160 through the first area 130 is relatively lower intensity light directed toward an observer 195. The lower intensity light may but used for accent lighting, for example. In some embodiments, light that exits the lightguide 100 generally along direction 162 may have relatively higher intensity light that is directed to illuminate a surface, e.g., the ground or the bed of a truck 702.

The illumination system 4000, 5000 may comprise the optical assembly shown in FIG. 4. With reference to FIG. 4, the optical cavity 200 includes a first area 210 and a second area 220. The first area 210 has an optical reflectance of at least 30% or at least 50% and an optical transmittance of at least 5% or at least 10% or at least 30% for normally incident light at a desired wavelength. The second area 220 has an optical transmittance of at least 80% or at least 90% for normally incident light at the desired wavelength. The first area 210 may be positioned so that it is easily observable by a driver during normal usage of the vehicle 701, 702. The first area 210 may have a pleasing metallized or chrome-look finish from the perspective of the driver. In some implementations, the first area has a color coating such that the light emerging from first area 1210 has a different color than light emerging from the second area 220. The second area 220 may be positioned so that it is not seen by the driver in normal usage of the vehicle 701, 702. For example, the first area 130 may be observable by the driver as the driver as the driver walks toward and/or enters the vehicle and the second area 140 may not be observable by the driver during these activities.

Light is extracted by features in region 317 and exits the first area 210 generally along direction 224. Light is extracted by features 327 and exits the second area 220 generally along direction 234. In some embodiments, the light that exits the optical cavity 200 generally along direction 224 is relatively lower intensity light directed toward an observer. The lower intensity light may be used for accent lighting, for example. Light that exits the optical cavity 200 generally along direction 234 is relatively higher intensity light that may be directed to illuminate a surface, e.g., the ground or the bed of the truck 702.

Items disclosed herein include:

Item 1. A lightguide comprising features for extracting light that would otherwise be confined and propagate within the lightguide primarily by total internal reflection, a first portion of light propagating within the light guide and extracted exiting the lightguide through a first area of the lightguide having an optical reflectance of at least 30% and an optical transmittance of at least 5% for normally incident light at a wavelength of the extracted light, a second portion of light propagating within the light guide and extracted exiting the lightguide through a different second area of the lightguide having an optical transmittance of at least 80% for normally incident light at the wavelength of the extracted light.

Item 2. The lightguide of item 1 being non-planar.

Item 3. The lightguide of any of items 1 through 2, wherein the first portion of light exits the lightguide along a first direction and the second portion of light exits the lightguide along a different second direction Item 4. The lightguide of item 3, wherein an angle between the first and second directions is in a range from about 30 degrees to about 150 degrees.

Item 5. The lightguide of item 3, wherein an angle between the first and second directions is in a range from about 50 degrees to about 120 degrees.

Item 6. The lightguide of any of items 1 through 5 comprising a first region, different than the first area, having features for extracting the first portion of light.

Item 7. The lightguide of any of items 1 through 6 comprising a second region, different than the second area, having features for extracting the second portion of light.

Item 8. The lightguide of any of items 1 through 5 comprising different first and second regions, the first region being different than the first area and having features for extracting the first portion of light, the second region being different than the second area and having features for extracting the second portion of light.

Item 9. The lightguide of item 8, wherein the first region faces the first area and the second region faces the second area.

Item 10. The lightguide of any of items 1 through 9 wherein the features for extracting light comprises a plurality of spaced apart light extractors.

Item 11. The lightguide of any of items 1 through 10, wherein the light extractors are protrusions formed on an exterior surface of the lightguide.

Item 12. The lightguide of any of items 1 through 11, wherein the light extractors are notches formed in an exterior surface of the lightguide.

Item 13. The lightguide of any of items 1 through 12, wherein the features for extracting light comprise a plurality of particles dispersed within the lightguide.

Item 14. The lightguide of any of items 1 through 13, wherein the wavelength of the extracted light is in a range from about 420 nm to about 680 nm.

Item 15. The lightguide of any of items 1 through 14, wherein the first area has an optical reflectance of at least 30% and an optical transmittance of at least 10% at the wavelength of the extracted light.

Item 16. The lightguide of any of items 1 through 15, wherein the first area has an optical reflectance of at least 50% and an optical transmittance of at least 30% at the wavelength of the extracted light.

Item 17. The lightguide of any of items 1 through 16, wherein the second area has an optical transmittance of at least 90% at the wavelength of the extracted light.

Item 18. The lightguide of any of items 1 through 17 having a round cross-sectional profile along a length of the lightguide.

Item 19. The lightguide of item 18 having a circular cross-sectional profile along the length of the lightguide.

Item 20. The lightguide of item 18 having an elliptical cross-sectional profile along the length of the lightguide.

Item 21. The lightguide of any of items 1 through 18 having a mushroom cross-sectional profile along a length of the lightguide.

Item 22. The lightguide of any of items 1 through 18 having a polygonal cross-sectional profile along a length of the lightguide.

Item 23. The lightguide of item 22 having a rectangular cross-sectional profile along the length of the lightguide.

Item 24. The lightguide of item 22 having a square cross-sectional profile along the length of the lightguide.

Item 25. The lightguide of any of items 1 through 24 having a first lightguide portion primarily for guiding light and a second lightguide portion primarily for attaching the lightguide to a lightguide support.

Item 26. The lightguide of item 25, wherein the first lightguide portion, but not the second lightguide portion, is continuous along a length of the lightguide.

Item 27. The lightguide of item 25, wherein the first and second lightguide portions are continuous along a length of the lightguide.

Item 28. The lightguide of item 25, such that in a transverse cross-section of the lightguide, the first lightguide portion is round and the second lightguide portion has a generally arrow shape.

Item 29. The lightguide of any of items 1 through 28, wherein a maximum dimension of a cross-sectional profile of the lightguide along a length of the lightguide is at least 50 times the wavelength of the extracted light.

Item 30. The lightguide of any of items 1 through 29 comprising a higher index core surrounded by a lower index cladding.

Item 31. The lightguide of item 30, wherein the core has an index in a range from about 1.4 to about 1.7.

Item 32. The lightguide of item 30, wherein the cladding has an index in a range from about 1.2 to about 1.5.

Item 33. The lightguide of item 30, wherein the core has a thickness in a range from about 0.5 mm to about 20 mm.

Item 34. The lightguide of item 30, wherein the cladding has a thickness in a range from about 10 microns to about 1000 microns.

Item 35. The lightguide of item 30, wherein the cladding comprises air.

Item 36. The lightguide of item 30, wherein the core has a gradient index along a thickness direction of the core.

Item 37. The lightguide of item 30, wherein the cladding has a gradient index along a thickness direction of the cladding.

Item 38. The lightguide of any of items 1 through 37 having a gradient index along a thickness direction of the lightguide.

Item 39. The lightguide of any of items 1 through 38, wherein the first area, but not the second area, comprises a partially reflective coating.

Item 40. A light assembly comprising:
  the lightguide of item 1; and
  a light source disposed at a first end of the lightguide, light emitted by the light source at the wavelength of the extracted light entering the lightguide from the first end and propagating within the lightguide primarily by total internal reflection.

Item 41. An elongate lightguide extending along a length of the lightguide and comprising:
  different first and second regions for extracting light, each region comprising a plurality of spaced apart light extractors arranged along the length of the lightguide for extracting light at a desired wavelength that would otherwise be confined and propagate within the lightguide along the length of the lightguide, light extracted by the first region exiting the lightguide through a first area having an optical reflectance of at least 30% and an optical transmittance of at least 5% for normally incident light at the desired wavelength, light extracted by the second region exiting the light guide through a second area, different from the first area, having an optical transmittance of at least 80% for normally incident light at the desired wavelength.

Item 42. The elongate lightguide of item 41 having a round cross-sectional profile along the length of the lightguide.

Item 43. The elongate lightguide of item 41 having a mushroom cross-sectional profile along the length of the lightguide.

Item 44. The elongate lightguide of any of item 41 having a polygonal cross-sectional profile along the length of the lightguide.

Item 45. The elongate lightguide of any of items 41 through 44 generally centered on an optical axis, the first and second regions being at different respective first and second azimuthal angles relative to the optical axis.

Item 46. The elongate lightguide of item 45, wherein a difference between the first and second azimuthal angles is at least 20 degrees.

Item 47. The elongate lightguide of any of items 41 through 46, wherein the plurality of spaced apart light extractors in at least one of the first and second regions comprises spaced apart notches formed in an exterior surface of the lightguide.

Item 48. The elongate lightguide of any of items 41 through 47, wherein the plurality of spaced apart light extractors in at least one of the first and second regions comprises spaced apart protrusions formed in an exterior surface of the lightguide.

Item 49. The elongate lightguide of any of items 41 through 48, wherein the plurality of spaced apart light extractors in at least one of the first and second regions comprises light extractors that extract light primarily by scattering the light.

Item 50. The elongate lightguide of any of items 41 through 49, wherein the plurality of spaced apart light extractors in at least one of the first and second regions comprises light extractors that extract light primarily by reflecting the light.

Item 51. The elongate lightguide of any of items 41 through 50, wherein the plurality of spaced apart light extractors in at least one of the first and second regions comprises light extractors that extract light primarily by refracting the light.

Item 52. The elongate lightguide of any of items 41 through 51, wherein the first area, but not the second area, comprises a partially reflective coating.

Item 53. The elongate lightguide of any of items 41 through 52, wherein at least 10% of light extracted by the first region exits the light guide through the first area, and at least 70% of light extracted by the second region exits the light guide through the second area.

Item 54. The elongate lightguide of any of items 41 through 52, wherein at least 10% of light extracted by the first region exits the light guide through the first area, and at least 80% of light extracted by the second region exits the light guide through the second area.

Item 55. The elongate lightguide of any of items 41 through 52, wherein at least 10% of light extracted by the first region exits the light guide through the first area, and at least 90% of light extracted by the second region exits the light guide through the second area.

Item 56. The elongate lightguide of any of items 41 through 52, wherein at least 20% of light extracted by the first region exits the light guide through the first area, and at least 70% of light extracted by the second region exits the light guide through the second area.

Item 57. An optical system comprising:
an elongate optical cavity extending along a length of the optical cavity and comprising:
a first area having an optical reflectance of at least 30% and an optical transmittance of at least 5% for normally incident light at a desired wavelength; and
a different second area having an optical transmittance of at least 80% for normally incident light at the desired wavelength; and
an elongate lightguide disposed in and coextensive with the optical cavity, the lightguide comprising a plurality of spaced apart light extractors arranged along a length of the lightguide for extracting light at a desired wavelength that would otherwise be confined and propagate within the lightguide along the length of the lightguide, such that at least first and second portions of light extracted by the light extractors exit the optical system through the respective first and second areas of the optical cavity.

Item 58. The optical system of claim 57, wherein the optical cavity and the lightguide have respective polygonal and round cross-sectional profiles.

Item 59. The optical system of any of items 57 through 58, wherein the optical cavity has a plurality of sides, a first side in the plurality of sides comprising the first area, a different second side in the plurality of sides comprising the second area.

Item 60. The optical system of any of items 57 through 59, wherein the plurality of spaced apart light extractors comprises a plurality of first light extractors disposed in a first region for extracting light the exits the optical system through the first area, and a plurality of second light extractors disposed in a different second region for extracting light the exits the optical system through the second area.

Item 61. The optical system of item 60, wherein the lightguide is generally centered on an optical axis, the first and second regions being at different respective first and second azimuthal angles relative to the optical axis.

Item 62. The elongate lightguide of item 60, wherein a difference between the first and second azimuthal angles is at least 20 degrees.

Item 63. The optical system of any of items 57 through 62, wherein the optical cavity and the lightguide define an air gap therebetween.

Item 64. The optical system of any of items 57 through 63, wherein the first portion is at least 10% of the light extracted by the light extractors and the second portion is at least 70% of the light extracted by the light extractors.

Item 65. The optical system of claim any of items 57 through 63, wherein the first portion is at least 10% of the light extracted by the light extractors and the second portion is at least 80% of the light extracted by the light extractors.

Item 66. An optical non-planar lightguide having light extractors for extracting light at a desired wavelength that would otherwise be confined and propagate within the lightguide primarily by total internal reflection, the non-planar lightguide comprising a core layer having a higher core index, a cladding layer disposed on at least a portion of the core layer and having a lower cladding index, and a reflective layer disposed on at least a portion of the cladding layer and having an optical reflectance of at least 30% and an optical transmittance of at least 5% for normally incident light at the desired wavelength, such that at least 2% of light extracted by the light extractors exits the lightguide through the reflective layer.

Item 67. The lightguide of item 66 having a round cross-sectional profile along a length of the lightguide.

Item 68. The lightguide of item 66 having a mushroom cross-sectional profile along a length of the lightguide.

Item 69. The lightguide of item 66 having a polygonal cross-sectional profile along a length of the lightguide.

Item 70. The lightguide of any of items 66 through 69, wherein the cladding layer is sufficiently thick so that light propagating within the lightguide primarily by total internal reflection undergoes a loss in optical intensity due to the reflective layer that is less than about 5%.

Item 71. The lightguide of any of items 66 through 70, wherein the cladding layer is sufficiently thick so that light propagating within the lightguide primarily by total internal reflection undergoes a loss in optical intensity due to the reflective layer that is less than about 2%.

Item 72. The lightguide of any of items 66 through 71, wherein the cladding layer covers substantially an entire external surface of the core layer.

Item 73. The lightguide of any of items 66 through 72, wherein the reflective layer covers substantially an entire external surface of the cladding layer.

Item 74. The lightguide of any of items 66 through 73, wherein the reflective layer comprises a metal layer.

Item 75. The lightguide of any of items 66 through 74, wherein the reflective layer comprises at least one dielectric layer.

Item 76. The lightguide of any of items 66 through 75, wherein at least some of the light extractors are protrusions formed on an external surface of the core layer.

Item 77. The lightguide of any of items 66 through 76, wherein at least some of the light extractors are recesses formed in an external surface of the core layer.

Item 78. The lightguide of any of items 66 through 77, wherein the reflective layer is disposed on a first, but not second, portion of the cladding layer, and wherein the light extractors comprise different first and second pluralities of light extractors, at least 80% of light extracted by the first plurality of light extractors exiting the lightguide through the first portion of the cladding layer, at least 80% of light extracted by the second plurality of light extractors exiting the lightguide through the second portion of the cladding layer.

Item 79. An illumination system for a vehicle, comprising:
 a structure configured to mount to the vehicle, the structure comprising:
  a lightguide comprising different first and second regions for extracting light, each region comprising a plurality of spaced apart light extractors arranged along the length of the lightguide for extracting light at a desired wavelength that would otherwise be confined and propagate within the lightguide along the length of the lightguide, light extracted by the first region exiting the lightguide through a first area having an optical reflectance of at least 30% and an optical transmittance of at least 5% for normally incident light at the desired wavelength, light extracted by the second region exiting the light guide through a second area, different from the first area, having an optical transmittance of at least 80% for normally incident light at the desired wavelength.

Item 80. The vehicle illumination system of item 79, wherein the structure comprises a roof rack, a running board, a step assist or a truck bed rail.

Item 81. The vehicle illumination system of any of items 79 through 80, wherein the light extracted by the second region provides functional lighting and the light extracted by the first region provides accent lighting, the functional lighting having a relatively higher intensity than the accent lighting.

Item 82. The vehicle illumination system of any of items 79 through 81, wherein the light extracted by the second region illuminates the ground or a truck bed of the vehicle.

Various modifications and alterations of this invention will be apparent to those skilled in the art and it should be understood that this scope of this disclosure is not limited to the illustrative embodiments set forth herein. For example, the reader should assume that features of one disclosed embodiment can also be applied to all other disclosed embodiments unless otherwise indicated.

The invention claimed is:

1. A lightguide comprising features for extracting light that would otherwise be confined and propagate within the lightguide primarily by total internal reflection, a first portion of light propagating within the light guide and extracted exiting the lightguide through a first area of the lightguide having an optical reflectance of at least 30% and an optical transmittance of at least 5% for normally incident light at a wavelength of the extracted light, a second portion of light propagating within the light guide and extracted exiting the lightguide through a different second area of the lightguide having an optical transmittance of at least 80% for normally incident light at the wavelength of the extracted light.

2. The lightguide of claim 1, wherein the first portion of light exits the lightguide along a first direction and the second portion of light exits the lightguide along a different second direction, wherein an angle between the first and second directions is in a range from about 30 degrees to about 150 degrees.

3. The lightguide of claim 1 comprising different first and second regions, the first region being different than the first area and having features for extracting the first portion of light, the second region being different than the second area and having features for extracting the second portion of light, wherein the first region faces the first area and the second region faces the second area.

4. The lightguide of claim 1, wherein the first area has an optical reflectance of at least 50% and an optical transmittance of at least 30% at the wavelength of the extracted light.

5. The lightguide of claim 1, wherein the second area has an optical transmittance of at least 90% at the wavelength of the extracted light.

6. The lightguide of claim 1, wherein a maximum dimension of a cross-sectional profile of the lightguide along a length of the lightguide is at least 50 times the wavelength of the extracted light.

7. The lightguide of claim 1 comprising a higher index core surrounded by a lower index cladding.

8. The lightguide of claim 1, wherein the first area, but not the second area, comprises a partially reflective coating.

9. An elongate lightguide extending along a length of the lightguide and comprising:
 different first and second regions for extracting light, each region comprising a plurality of spaced apart light extractors arranged along the length of the lightguide for extracting light at a desired wavelength that would otherwise be confined and propagate within the lightguide along the length of the lightguide, light extracted by the first region exiting the lightguide through a first area having an optical reflectance of at least 30% and an optical transmittance of at least 5% for normally incident light at the desired wavelength, light extracted by the second region exiting the light guide through a second area, different from the first area, having an optical transmittance of at least 80% for normally incident light at the desired wavelength.

10. The elongate lightguide of claim 9 generally centered on an optical axis, the first and second regions being at different respective first and second azimuthal angles relative to the optical axis.

11. The elongate lightguide of claim 9, wherein at least 10% of light extracted by the first region exits the light guide through the first area, and at least 70% of light extracted by the second region exits the light guide through the second area.

12. The elongate lightguide of claim 9, wherein at least 20% of light extracted by the first region exits the light guide through the first area, and at least 70% of light extracted by the second region exits the light guide through the second area.

13. An optical system comprising:
an elongate optical cavity extending along a length of the optical cavity and comprising:
a first area having an optical reflectance of at least 30% and an optical transmittance of at least 5% for normally incident light at a desired wavelength; and
a different second area having an optical transmittance of at least 80% for normally incident light at the desired wavelength; and
an elongate lightguide disposed in and coextensive with the optical cavity, the lightguide comprising a plurality of spaced apart light extractors arranged along a length of the lightguide for extracting light at a desired wavelength that would otherwise be confined and propagate within the lightguide along the length of the lightguide, such that at least first and second portions of light extracted by the light extractors exit the optical system through the respective first and second areas of the optical cavity.

14. The optical system of claim 13, wherein the optical cavity has a plurality of sides, a first side in the plurality of sides comprising the first area, a different second side in the plurality of sides comprising the second area.

15. The optical system of claim 13, wherein the plurality of spaced apart light extractors comprises a plurality of first light extractors disposed in a first region for extracting light the exits the optical system through the first area, and a plurality of second light extractors disposed in a different second region for extracting light the exits the optical system through the second area.

16. The optical system of claim 15, wherein the lightguide is generally centered on an optical axis, the first and second regions being at different respective first and second azimuthal angles relative to the optical axis.

17. The elongate lightguide of claim 15, wherein a difference between the first and second azimuthal angles is at least 20 degrees.

18. The optical system of claim 13, wherein the optical cavity and the lightguide define an air gap therebetween.

19. The optical system of claim 13, wherein the first portion is at least 10% of the light extracted by the light extractors and the second portion is at least 70% of the light extracted by the light extractors.

20. The optical system of claim 13, wherein the first portion is at least 10% of the light extracted by the light extractors and the second portion is at least 80% of the light extracted by the light extractors.

* * * * *

UNITED STATES PATENT AND TRADEMARK OFFICE
CERTIFICATE OF CORRECTION

PATENT NO. : 10,718,890 B2  
APPLICATION NO. : 16/080755  
DATED : July 21, 2020  
INVENTOR(S) : Brian Ostlie Page 1 of 1

It is certified that error appears in the above-identified patent and that said Letters Patent is hereby corrected as shown below:

In the Specification

Column 8
Line 38, delete "1210" and insert -- 210 --, therefor.

Column 9
Line 7, after "direction" insert -- . --.

In the Claims

Column 16
Claim 17, Line 15, delete "elongate lightguide of claim 15" and insert -- optical system of claim 16 --.

Signed and Sealed this  
Twenty-third Day of March, 2021

Drew Hirshfeld  
*Performing the Functions and Duties of the  
Under Secretary of Commerce for Intellectual Property and  
Director of the United States Patent and Trademark Office*